Nov. 9, 1926. 1,606,365
M. E. HAMILTON ET AL
ENGINE EQUIPMENT FOR AIR BRAKE APPARATUS
Filed June 3, 1926 2 Sheets-Sheet 2
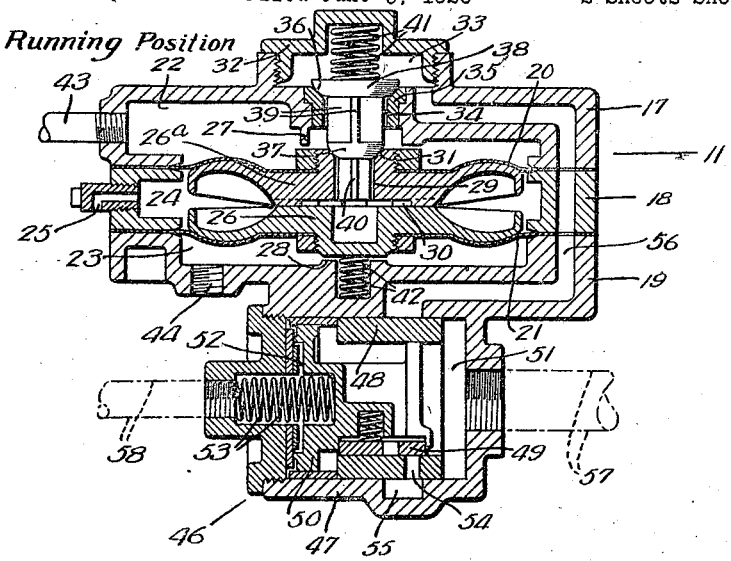
Fig.3. Running Position
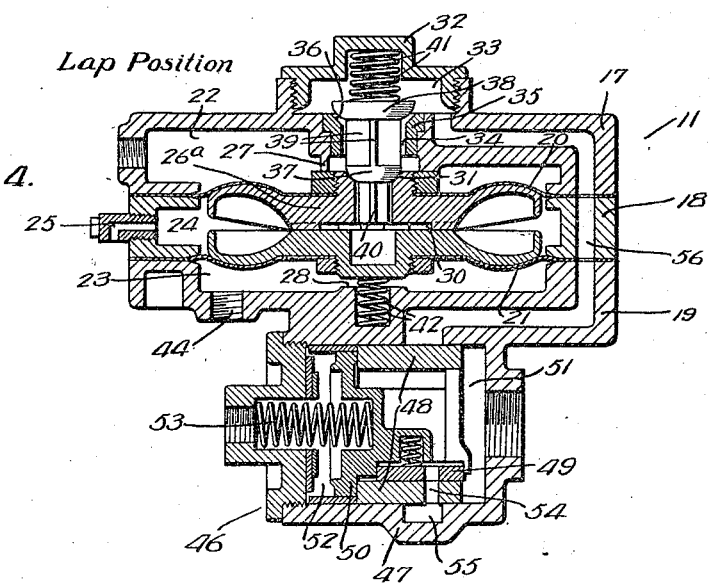
Fig.4. Lap Position
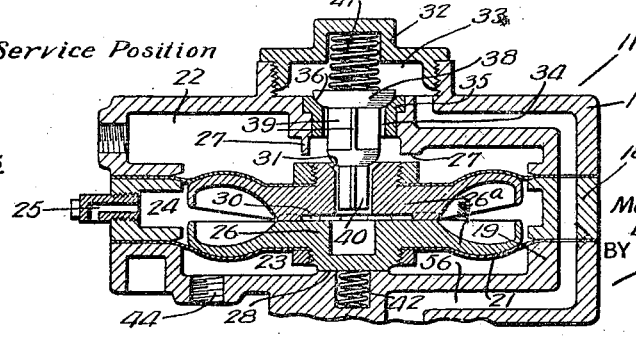
Fig.5. Service Position
INVENTOR
Maurice E. Hamilton
Edward P. Wilson
BY
ATTORNEYS Patented Nov. 9, 1926.

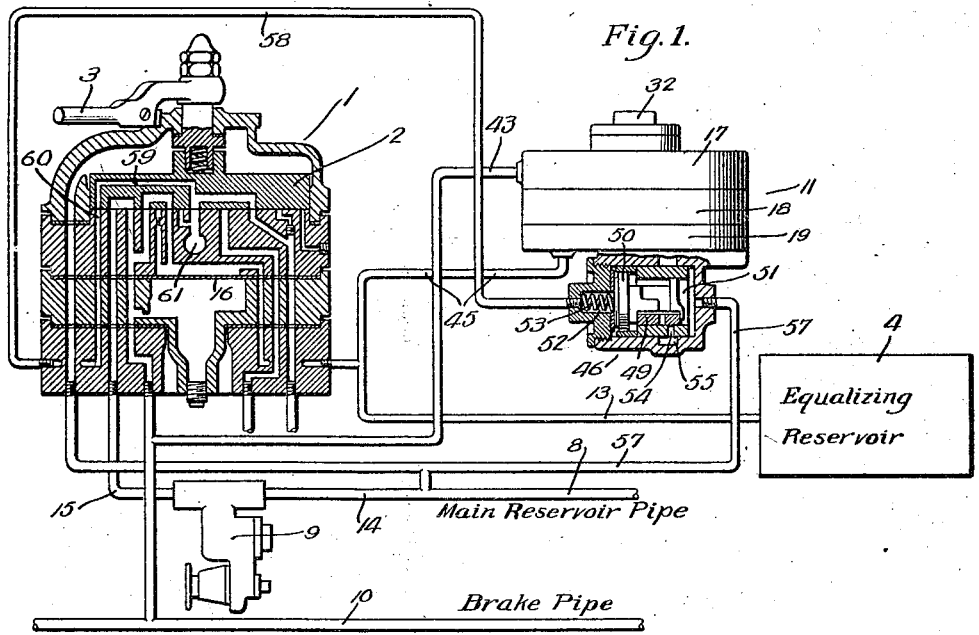

1,606,365

UNITED STATES PATENT OFFICE.

MAURICE E. HAMILTON, OF PAWTUCKET, RHODE ISLAND, AND EDWARD P. WILSON, OF EAST ORANGE, NEW JERSEY, ASSIGNORS TO AUTOMATIC STRAIGHT AIR BRAKE COMPANY, OF WILMINGTON, DELAWARE, A CORPORATION OF DELAWARE.

ENGINE EQUIPMENT FOR AIR-BRAKE APPARATUS.

Application filed June 3, 1926. Serial No. 113,463.

This invention relates to certain improvements in that type of apparatus shown in the application filed by Spencer G. Neal, February 26, 1925, Serial No. 11,775. That application discloses a brake pipe compensating valve which will be operative in the lap position of the engineer's brake valve and which will be ineffective as a feed valve or compensating valve in all other positions of the said brake valve.

The object of this invention is to provide a compensating valve which will be positive and certain in its operation.

In the drawings:

Fig. 1 is a diagrammatic view partly in section of certain portions of the standard Westinghouse ET equipment with the invention embodied therein, the engineer's brake valve being shown in running position;

Fig. 2 a view similar to Fig. 1 showing the engineer's brake valve in lap position;

Fig. 3 a longitudinal vertical sectional view of the compensating valve showing the parts in the positions they will assume with the engineer's brake valve in running position;

Fig. 4 a view similar to Fig. 3 showing the parts in the positions they will assume with the engineer's brake valve in lap position; and Fig. 5 a detail sectional view of a portion of the compensating valve with the parts in the positions they will assume with the engineer's brake valve in service position.

Referring to the various parts by numerals, 1 designates a standard Westinghouse automatic brake valve as used with the Westinghouse ET engine equipment, said valve being illustrated diagrammatically in Figs. 1 and 2. 2 designates the rotor of the engineer's brake valve and 3 the handle for manipulating the rotor in the usual manner. 4 designates the equalizing reservoir which is connected to the brake valve in the usual manner. 8 designates the pipe leading to the main reservoir and 9 designates the usual automatic feed valve. 10 designates the brake pipe and 11 the compensating valve. The equalizing reservoir is connected to the usual port in the brake valve by pipe 13. The feed valve is connected to the main reservoir pipe by a pipe connection 14, the opposite side of said feed valve being connected to the usual port in the brake valve by a pipe 15. The engineer's brake valve is operated precisely as in the standard Westinghouse ET equipment and it is thought to be unnecessary to more particularly describe it herein. The compensating valve, hereinafter described, takes the place of the equalizing discharge valve of the engineer's brake valve, and as shown in the drawings, the equalizing discharge piston and valve have been removed and the equalizing chamber is closed by a blind gasket 16.

The compensating valve 11 is shown as comprised of three circular castings 17, 18 and 19, the casting 18 being in the form of a ring clamped between the end castings 17 and 19. Between the castings 17 and 18 is arranged a transverse brake pipe diaphragm 20 and between the castings 18 and 19 is arranged a transverse equalizing reservoir diaphragm 21. In the casting 17 above the diaphragm 20 is formed a brake pipe chamber 22. In the casting 19 below the diaphragm 21 is formed an equalizing reservoir chamber 23, and between the diaphragms 20 and 21 is formed an atmospheric chamber 24. The ring 18 serves to space the diaphragms 20 and 21 from each other and to form the atmospheric chamber. This chamber is open to atmosphere through the port 25 formed through the ring 18. The two diaphragms are centrally supported by rigid structures 26 and 26$^a$. The diaphragms and their central supporting structures are pressed toward each other by the opposing pressures in chambers 22 and 23 so that the diaphragms move together. The structure 26$^a$ is formed with downwardly extending lugs which contact with the upper surface of the central portion 26 and hold said structures spaced apart to form the channel 30 which is open around its margin into the atmospheric chamber 24. It will, of course, be understood that the central diaphragm supporting structure may be of any suitable construction. Stops 27 limit the upward movement of the diaphragms and stop 28 limits the downward movement thereof so that the said diaphragms will have only a limited up-and-down movement in response to variations in pressures in the chambers 22 and 23. The central rigid portion 26$^a$ of the diaphragm 20 is formed with a large central bore 29 which opens at its lower end into the channel formed between the parts 26 and 26a, so that the lower end of said bore is in direct communication with the atmospheric chamber 24. The upper end of the bore 29 opens into the brake pipe chamber 22 and is formed with a valve seat 31. On the top of the casting 17 is screwed a cap 32 which forms a supply valve chamber 33. This chamber is in communication with the brake pipe chamber 22 through a large central passage 34. This passage is provided with a bushing 35, the upper end of which forms a valve seat 36. A brake pipe vent valve 37 is adapted to fit tightly on the valve seat 31, and a brake pipe supply valve 38 is adapted to fit tightly on valve seat 36. The two valves 37 and 38 are rigidly connected together by vertical ribs or wings 39 so that said valves will move together. The valve 37 is formed with a depending stem 40 which fits loosely in the bore 29 and serves as a guide means for the valve and for the diaphragm structure when said structure moves downwardly independently of the valves. A spring 41 confined between the cap 32 and the valve 38 normally holds said valve seated. Chamber 22 is connected to the brake pipe through a pipe connection 43. The equalizing reservoir chamber 23 is connected to the equalizing reservoir through passage 44 and pipe connection 45. Interposed between the central structure 26 and the lower wall of the equalizing reservoir chamber 23 is a spring 42 which normally tends to hold the valve seat 31 in contact with the valve 37. The diaphragm structure is moved downwardly against the tension of spring 42.

A main reservoir cut-off valve 46 controls communication between the main reservoir and the chamber 33 above the brake pipe supply valve 38. This cut-off valve comprises a casing 47 preferably cast integral with the casting 19 and provided with an internal annular bushing 48. The lower portion of the bushing forms a seat for a slide valve 49 which is operatively connected to a piston 50 operating in a chamber formed in the casing 47, said piston serving as a movable abutment separating a main reservoir chamber 51 from a supplemental reservoir chamber 52. A spring 53 tends to hold the valve 49 in its inner position, in which position the said valve opens a port 54. Port 54 leads into a channel 55, said channel being connected to chamber 33 by a passage 56. The main reservoir chamber 51 is connected to the main reservoir pipe 8 by a pipe 57. The supplemental main reservoir chamber 52 is connected to the brake valve by a pipe 58. Main reservoir pressure is present in chamber 51 at all times. Main reservoir pressure is present in chamber 52 when the engineer's brake valve is in lap position, in which position of the said valve pipe 58 is connected to the main reservoir chamber of said valve. (See Fig. 2.) When the main reservoir pressure is balanced on opposite sides of the piston 50 the spring 53 will force the valve 49 to its open position thereby opening communication between the main reservoir and the chamber 33. When the engineer's brake valve is placed in running position, as illustrated in Fig. 1, a port 59 in the rotor 2 of said valve will connect the port 60 to the atmospheric port 61 of the said brake valve. In this position of the engineer's brake valve the pipe 58 will be connected to atmosphere so that the air in chamber 52 will flow to atmosphere through the engineer's brake valve. The high main reservoir pressure in chamber 51 will force the piston and the valve 49 inwardly, compressing spring 53 and closing the port 54. This will cut off the main reservoir from chamber 33 above the brake pipe supply valve 38 and thus render the compensating valve inoperative and ineffective as a brake pipe feed valve so long as the engineer's brake valve remains in running position. In both service and emergency positions of the brake valve, port 59 is so arranged, by suitable elongation, to maintain communication between ports 60 and 61 thereby rendering the compensating valve inoperative as a brake pipe feed valve during the service and emergency positions of the brake valve, as well as in the running position. In the lap position of the engineer's brake valve the compensating valve will operate to maintain the brake pipe pressure substantially equal to the equalizing reservoir pressure which was established by the service operation of the engineer's brake valve. When the engineer's brake valve is returned to running position, which will connect the pipe 58 to the port 61, the pressure in chamber 51 will again move the cut-off valve to close port 54 and thereby cut off the main reservoir from chamber 33.

Operation: The charging of the brake pipe is caused, as is well known in present braking systems of the standard type, by placing the engineer's valve in the full release position in order quickly to charge the brake pipe; said engineer's valve being placed at the running position, as in present practice, as soon as the desired maximum brake pipe pressure has been obtained. The brake pipe having thus been charged to the required pressure and the equalizing reservoir 4 also being charged to an equality with the brake pipe pressure, the result will be that the pressure in the equalizing reservoir chamber 23, which is in communication with the equalizing reservoir 4, will be the same as the brake pipe pressure in the brake pipe chamber 22 of the compensating valve, said chamber 22 being in direct communication with the brake pipe through the pipe 43. With the pressure as just described, in order to make a reduction of the brake pipe pressure the brake valve is placed in the service position, thereby releasing air from the equalizing reservoir 4 to the atmosphere to any desired amount, and thus through pipe 45 releasing pressure from the equalizing chamber 23 of the compensating valve below the pressure in the brake pipe chamber 22 of said compensating valve. The result of this change of pressure will be to allow the excess pressure in chamber 22 on the upper side of diaphragm 20 to lower the diaphragms and the parts connected therewith to the position shown in Fig. 5 thus opening a passage around the valve 37 to release brake pipe air through the chamber 24 and port 25 to atmosphere. When the brake pipe pressure in the brake pipe chamber 22 has thus been reduced substantially to the reduced or established pressure in equalizing reservoir chamber 23, said diaphragms and the parts carried thereby will move upward until the seat 31 engages the valve 37, thus cutting off further escape of brake pipe air. If the engineer's brake valve be now placed in lap position, as shown in Fig. 2, pipe 58 will be connected through port 60 and a small port 62 in the rotor 2, to the main reservoir chamber of the brake valve. Main reservoir air may, therefore, flow into chamber 52 and equalize with the pressure in chamber 51. The spring 53 will thereupon force the valve 49 to its open position and establish communication between the main reservoir and the chamber 33 above the supply valve 38. The compensating valve is now effective as a brake pipe feed valve and its operation will be dependent upon the differences in pressures in the brake pipe chamber 22 and in the equalizing reservoir chamber 23. Should the pressure in chamber 22 be reduced by reason of brake pipe leakage, the superior pressure in the equalizing reservoir chamber 23 will move the diaphragm and the valves 37 and 38 upwardly. This operation will open the supply valve 38, as shown in Fig. 4, and permit main reservoir air to flow from chamber 33 past valve 38 into the brake pipe chamber 22 and thence to the brake pipe through pipe 43. So long as the brake pipe pressure remains below the equalizing reservoir pressure the supply valve 38 will be held open. As the brake pipe leakage is continuous, if not constant, the supply valve will be held open sufficiently to supply air to the brake pipe to compensate for the brake pipe leakage. The diaphragms and the supply valve will assume a position, which might be termed a position of equilibrium, wherein the supply valve will be held open to supply air to the brake pipe at the rate of the leakage. Of course if the leakage should stop the brake pipe pressure would be immediately built up to a substantial equality with the equalizing reservoir pressure and the supply valve would then be closed. Because of the continuous leakage, however, there must be a continuous supply and for that reason the supply valve will be held open as long as the engineer's brake valve is held in lap position. When the engineer's brake valve is placed in running position pipe 58 leading from chamber 52 is connected to atmospheric port 61, as hereinbefore described, and the main reservoir pressure in chamber 51 will move the valve 49 to close the port 54 and thereby render the compensating valve ineffective as a brake pipe feed valve.

What we claim is:

1. An air brake apparatus comprising a brake pipe, an engineer's brake valve, a main reservoir, an equalizing reservoir, a brake pipe compensating valve subject to brake pipe pressure opposed to the pressure of the equalizing reservoir and controlling communication between the brake pipe and atmosphere and between the main reservoir and the brake pipe, the equalizing reservoir pressure tending to open communication between the main reservoir and the brake pipe and the brake pipe pressure tending to open communication between the brake pipe and atmosphere, a cut-off valve controlling communication between the main reservoir and the compensating valve, means whereby the engineer's valve in running, service and emergency positions will permit main reservoir pressure to close the cut-off valve, means whereby the engineer's brake valve in lap position will equalize main reservoir pressure on opposite sides of the cut-off valve, and a spring normally tending to move the cut-off valve to open position.

2. An air brake apparatus comprising a brake pipe, an engineer's brake valve, a main reservoir, an equalizing reservoir, a brake pipe compensating valve subject to brake pipe pressure opposed to the pressure of the equalizing reservoir and controlling communication between the brake pipe and atmosphere and between the main reservoir and the brake pipe, the equalizing reservoir pressure tending to open communication between the main reservoir and the brake pipe and the brake pipe pressure tending to open communication between the brake pipe and atmosphere, a cut-off valve controlling communication between the main reservoir and the compensating valve, means whereby the engineer's valve in running, service and emergency positions will permit main reservoir pressure to close the cut-off valve, and means whereby the engineer's brake valve in lap position will permit the cut-off valve to open communication between the main reservoir and the compensating valve.

3. An air brake apparatus comprising a brake pipe, an engineer's brake valve, a main reservoir, an equalizing reservoir, a brake pipe compensating valve subject to brake pipe pressure opposed to the pressure of the equalizing reservoir and controlling communication between the brake pipe and atmosphere and between the main reservoir and the brake pipe, the equalizing reservoir pressure tending to open communication between the main reservoir and the brake pipe and the brake pipe pressure tending to open communication between the brake pipe and atmosphere, a cut-off valve controlling communication between the main reservoir and the compensating valve, a piston connected to said valve, a spring operating on one side of said piston and tending to force the cut-off valve to open position, means for admitting main reservoir air to the other side of said piston to close said valve, means whereby the engineer's valve in running, service and emergency positions will exhaust the air from one side of said piston to permit said cut-off valve to close, and means whereby the engineer's brake valve in lap position will equalize main reservoir pressure on opposite sides of said piston and thereby permit the said spring to open said cut-off valve.

In testimony whereof we hereunto affix our signatures this 29th day of May, 1926.

MAURICE E. HAMILTON.
EDWARD P. WILSON.